Figure 1:
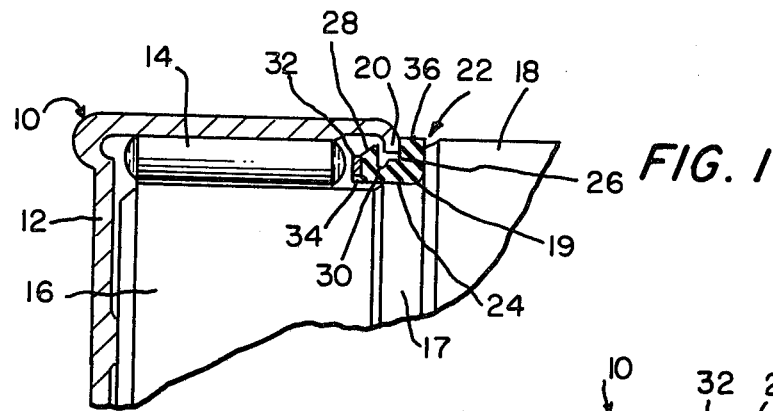

United States Patent [19]

Batt

[11] 4,385,789
[45] May 31, 1983

[54] SEALED ROLLER BEARINGS

[75] Inventor: Robert S. Batt, Barby, near Rugby, England

[73] Assignee: The Torrington Company Limited, Conventry, England

[21] Appl. No.: 243,165

[22] Filed: Mar. 12, 1981

[30] Foreign Application Priority Data

Mar. 19, 1980 [GB] United Kingdom ............... 8009213

[51] Int. Cl.³ .......................................... F16C 33/78
[52] U.S. Cl. .................................. 308/187.1; 308/216
[58] Field of Search .................. 308/187.2, 36.1, 36.2, 308/187.1, 207 R, 216; 277/95; 29/148.4 S, 149.5 R; 464/11, 131, 133, 117, 128

[56] References Cited

U.S. PATENT DOCUMENTS

| 2,071,198 | 2/1937 | Chambers | 308/187.2 |
|---|---|---|---|
| 2,338,169 | 1/1944 | Dunn | 308/187.1 X |
| 2,764,433 | 9/1956 | Cobb | 308/187.1 X |
| 3,190,702 | 6/1965 | Flick | 308/36.1 X |
| 3,549,221 | 12/1970 | Leak | 308/187.2 |
| 3,906,746 | 9/1975 | Haines | 308/187.2 X |
| 3,951,482 | 4/1976 | Blaydon et al. | 308/187.1 |
| 4,021,085 | 5/1977 | Willyard | 464/131 X |
| 4,154,490 | 5/1979 | Köhler et al. | 308/187.2 |

FOREIGN PATENT DOCUMENTS 195544 10/1967 U.S.S.R. ........................... 308/187.1

Primary Examiner—Stuart S. Levy
Assistant Examiner—Scott J. Haugland
Attorney, Agent, or Firm—F. S. Troidl

[57] ABSTRACT

Rollers of a roller bearing are disposed between a cup-shaped bearing shell and a trunnion which forms part of a cruciform member of a universal joint. The interior of the bearing is sealed by an elastomeric sealing member onto which an in-turned end lip on the bearing shell is snap-fitted by virtue of an inclined ramp surface on the sealing member, the end lip being thereby received in an annular groove in the sealing member. The latter is axially seated against a shoulder and a fillet.

8 Claims, 4 Drawing Figures

SEALED ROLLER BEARINGS

This invention concerns roller bearings and relates more particularly to such bearings comprising a plurality of rollers positioned between a cylindrical cup-shaped bearing housing or shell and a shaft.

For service in conditions where contamination may occur, it is desirable to provide a roller bearing with a seal arranged to exclude contaminants from penetrating an open axial end of the bearing and a number of seals have already been proposed for this purpose. Their incorporation in a bearing, however, is expensive because it requires special assembly steps such as the cold curling of an end lip on the bearing shell to clamp the seal in position after it has been fitted into the shell. Because the bearing shell must be hardened prior to insertion of the rollers and the fitting of the seal, the end lip must be prevented from becoming hardened or must be subsequently heat treated to soften it. As a consequence, the use of sealed bearings is often avoided in the manufacture of mass-produced components, for example, for use in the automobile industry, with consequent risk of short service life for the unsealed bearings actually employed.

The invention seeks to avoid the additional assembly steps and the expense of prior art arrangements for fitting axial end seals to roller bearings by providing a seal which can be located in a bearing housing or shell which is delivered from a press in a finished form ready for use after heat treatment, in accordance with current mass-production, manufacturing practice.

A sealed roller bearing according to the present invention comprises a bearing shell adapted to receive a shaft and having an in-turned end lip encircling one open end thereof, rollers disposed between the bearing shell and the shaft, and a seal at the open end of the bearing shell, the seal being an annular elastomeric body member of which the outer peripheral surface is radially inwardly recessed intermediate the axial end portions of said body member to define an annular groove for receiving the axial end lip of the bearing shell and of which one axial end portion, intended to penetrate into said bearing shell, is of frusto-conical or similarly inwardly tapering shape to facilitate passage of said body member end past said lip as the seal is snapped onto the lip.

The seal provided in the bearing of the invention is thus assembled onto and located upon an already-existing axial end lip of the bearing shell after the rollers have been placed in position, eliminating the previous need to maintain the shell partly unfinished until such time as the seal had been located and subsequently clamped therein.

The bearing shell is preferably cup-shaped and the shaft is usually a trunnion.

If desired, the bearing shell may be slightly modified to assist the assembly of the seal into it, by terminating the end lip of the bearing shell radially outwardly of the roller pitch circle, which is the circular path each roller axis follows as the rollers roll around the trunnion thus reducing the radial depth of the lip and defining a lip bore of greater diameter.

The internal diameter of the seal body member is advantageously so chosen that the seal is a free sliding fit on the shaft, to reduce the risk of the seal being pushed right inside the bearing shell when the bearing is being assembled on the shaft.

The reduced diameter, axially inner end of the seal body member may carry a washer of harder material, such as a hardened steel washer, to provide an axial abutment for the rollers when the bearing is in use.

Figure 2:
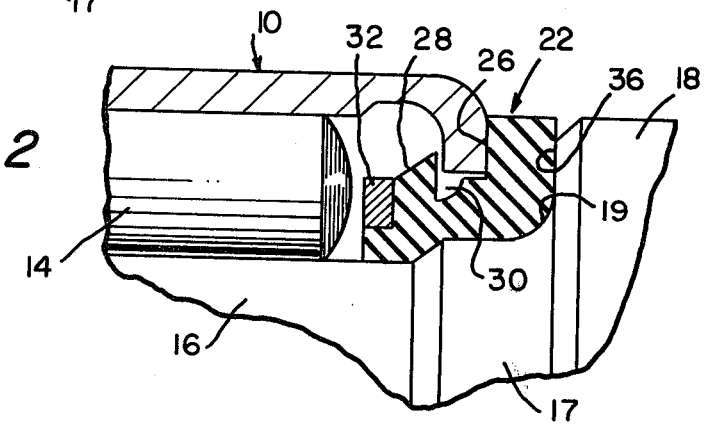
Figure 3:
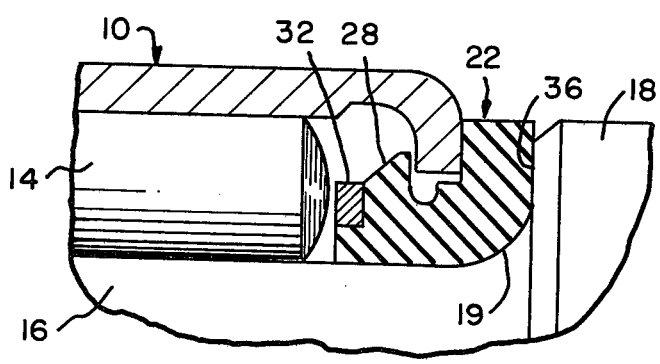
Figure 4:
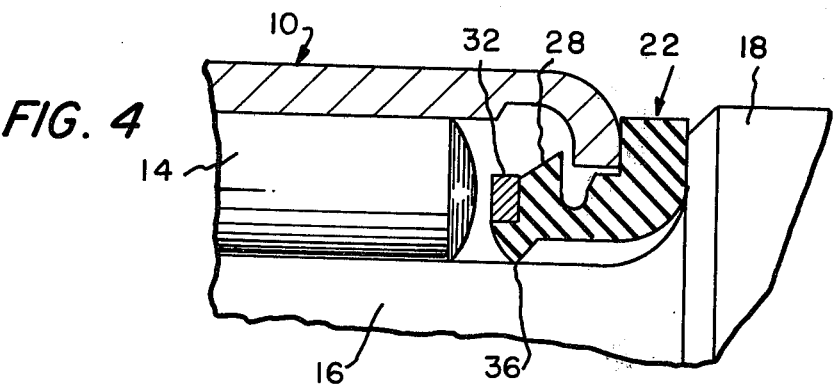

The invention will be described further, by way of example, with reference to the accompanying drawings, in which:

FIG. 1 is an axial section of a part of a roller bearing embodying a seal according to the invention; and FIGS. 2 to 4 inclusive are similar fragmentary sections of alternative embodiments of the invention.

The bearings shown in the drawings are all intended for use in universal joints and each has a bearing housing or shell 10 which is in the form of a cup deep-drawn from steel strip and having one axially closed end 12. The bearing shell 10 is of cylindrical shape and contains a plurality of rollers 14, which may be so-called needles, distributed around its internal cylindrical surface. In use, the bearing is mounted upon a respective one of four trunnions 16 of a cruciform intermediate member 18 of a universal joint, the shell 10 being intended to be located in a bore in a limb of the fork of bifurcated member (not shown) of the joint.

Referring now to FIG. 1, the open axial end of the bearing shell 10 is formed with a radially inwardly-directed lip 20 before the shell is subjected to a conventional hardening process. In order to prevent the ingress of dirt or other contaminants through the clearance between the lip 20 and the trunnion 16, the invention provides an annular elastomeric seal generally designated 22 and comprising an annular body member 24 which, intermediate its axial end portions, is formed in its outer periphery with a radially inwardly-directed recess or groove 26 with a bottom surface portion parallel to the inside diameter surface of the in-turned end lip 20 by means of which the seal 22 is engageable within the bore circumscribed by the lip 20, with the lip seated in the groove 26. Assembly of the seal 22 onto the shell 10 after the rollers 14 have been inserted in the shell is facilitated by providing the axially inner end portion of the body 24 with a reduced external diameter and by shaping the inner end portion in frusto-conical fashion as indicated at 28. The groove 26 behind the frusto-conical end portion 28 may be formed with a radially deeper annular void 30 which permits the end portion 28 to displace slightly, both radially and axially, as the seal is pushed into the bearing shell 10.

In the embodiment illustrated in FIG. 1, the bore of the seal 22 is straight and is a free sliding fit on the trunnion 16 so that no interference occurs between the internal periphery of the seal and the trunnion 16 as the bearing is being assembled on to the cruciform member 18 until the seal encounters an enlarged portion 17 of the trunnion adjacent a shoulder 36 of the cruciform member 18. This obviates the risk of the seal 22 being pushed inside the bearing shell during the assembly. The seal 22 thus becomes seated on the portion 17 and against the shoulder 36 and a rounded fillet 19 between the portion 17 and the shoulder 36.

Alternative embodiments as shown in FIGS. 2, 3 and 4 may be employed. In FIG. 2, the internal periphery of the seal 22 is shown as being shaped to fit snugly around the enlarged portion 17 of the trunnion 16 adjacent the shoulder 36 of the cruciform member 18 but is still a free sliding fit on the trunnion 16. FIG. 3 illustrates a cruciform member 18 in which there is simply a radiused fillet 19 where the trunnion 16 adjoins the shoulder 36 of the cruciform member 18, the seal 22 being shaped to fit such radiused fillet but being a free sliding fit on the trunnion. FIG. 4 illustrates the provision of a radially inwardly-directed sealing lip 36 to enhance the sealing effect, whilst not significantly inhibiting the slidability of the seal along the trunnion during assembly.

To further reduce the risk of the seal being pushed right inside the shell 10 during assembly onto the trunnion 16, the external diameter of the seal at its axially outer end is larger than the external diameter at its axially inner end, in each of the illustrated embodiments.

Although not always necessary, dependent upon the material of the seal 22, an axial abutment to insure free running of the rollers 14 even should they come into contact with the seal is provided by fitting the axially inner end portion 28 of the seal with a hardened steel annular washer 32. The washer 32 is preferably carried on an axial flange 34 of the seal 22 to insure that the washer is both axially and radially located with respect to the seal.

An advantage of the illustrated embodiments of the invention is that the snap-fitting of the seal onto the bearing shell 10 avoids the lip 20 having to be formed after the shell has been hardened, which would require the lip either to remain unhardened or to be subjected to a subsequent softening process.

The seal 22 is generally made of oil resistant rubber, preferably a neoprene rubber.

I claim:

1. A sealed roller bearing comprising a bearing shell adapted to receive a shaft and having an in-turned end lip encircling one open end thereof, rollers disposed between the bearing shell and the shaft, and a seal at the open end of the bearing shell, the seal being an annular elastomeric body member of which the outer peripheral surface has an annular groove with a bottom surface portion parallel to the inside diameter surface of the in-turned end lip intermediate the axial inner and outer end portions of the said body member for receiving the axial end lip of the bearing shell, said annular groove also having a radially deeper annular void portion to facilitate flexure of the said axially inner end of the body member and of which the axial inner end portion, intended to penetrate into said bearing shell, is of inwardly-tapering shape to facilitate passage of said body member end past said lip as the seal is snapped onto the lip.

2. A roller bearing as claimed in claim 1, in which an abutment washer is disposed on the said inner end of the seal body member for abutment by the ends of the rollers.

3. A roller bearing as claimed in claim 1, in which the external diameter of the seal body member at its axially outer end portion is larger than that at its axially inner portion.

4. A roller bearing as claimed in claim 3, in which the bearing shell is cup-shaped.

5. A roller bearing as claimed in claim 4, in which a shaft is received in the bearing and the internal diameter of the seal body member is such that the latter is a free axially sliding fit on the shaft.

6. A roller bearing as claimed in claim 5, in which the shaft is one of four trunnions on a cruciform intermediate member of a universal joint and the juncture between the trunnion and a shoulder formed on a body portion of the cruciform member is in the form of a radiused fillet, said seal body member being axially seated against said shoulder.

7. A roller bearing as claimed in claim 6, in which the seal body member is also axially seated against the fillet and radially seated on the portion of the trunnion adjacent the fillet.

8. A roller bearing as claimed in claim 6, in which the seal body member has an inwardly directed sealing lip which engages the portion of the trunnion adjacent the fillet.

* * * * *